(12) United States Patent
Delatorre et al.

(10) Patent No.: US 6,877,160 B2
(45) Date of Patent: Apr. 5, 2005

(54) METHOD, APPARATUS AND PROGRAM STORAGE DEVICE FOR ENABLING THE READING OF DATA FROM A NAMED PIPE WHILE MINIMIZING THE USE OF SYSTEM RESOURCES

(75) Inventors: Miguel A. Delatorre, Lagrangeville, NY (US); James M. Bodoh, Tampa, FL (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 09/726,777

(22) Filed: Nov. 30, 2000

(65) Prior Publication Data

US 2002/0065954 A1 May 30, 2002

(51) Int. Cl.$^7$ ............................................... G06F 9/00
(52) U.S. Cl. ..................... 718/104; 719/312; 719/313; 719/314; 709/213; 707/10; 711/147; 711/148; 711/149
(58) Field of Search .................. 707/1–10, 101–104.1; 709/201–253, 100–108, 213–234, 312–316; 711/147–154; 718/100–108

(56) References Cited

U.S. PATENT DOCUMENTS

| 5,446,894 | A | * | 8/1995 | DeMar et al. | ............... | 709/107 |
| 5,448,734 | A | * | 9/1995 | Hrabik et al. | ............... | 719/314 |
| 5,968,134 | A | * | 10/1999 | Putzolu et al. | ............... | 709/238 |
| 6,178,459 | B1 | * | 1/2001 | Sugiyama | ................... | 709/238 |
| 6,378,004 | B1 | * | 4/2002 | Galloway et al. | ........... | 719/321 |

OTHER PUBLICATIONS

Stevens, R "Unix Network Programming" Prentice Hall 1990 pp. 102–105.*
http://www9.s390.ibm.com/products/tpfv6n2a04.htm, entitled "About TPF MQSeries Support", created May 5, 2000, pp. 1–8.
http://www1.s390.ibm.com/products/tpf/v3n1a10.html, entitled TCP/IP Support is Coming to TPF, created May 5, 2000, pp. 1–3.
http://www.s390.ibm.com:/products/tpf/v6n2a10.htm, entitled "Designing an Internet Server on TPF", created May 5, 2000, pp. 1–4.

(Continued)

*Primary Examiner*—St. John Courtenay, III
*Assistant Examiner*—Charles Anya
(74) *Attorney, Agent, or Firm*—William A. Kinnaman, Jr.

(57) ABSTRACT

A method, apparatus and program storage device for enabling the reading of data from a named pipe by a reader process while minimizing the use of system resources in an information handling system in which client and reader processes write data to and read data from a named pipe by issuing function calls to an operating system. A first reader process creates a named pipe if it does not already exist and issues a read function call to the operating system specifying the named pipe to attempt to read data from the pipe. If the read operation is successful, the first reader process repeats the step of issuing the read function call. Otherwise, the first reader process issues an activate-on-receipt function call to the operating system, specifying the named pipe, a new reader process to be activated upon the receipt of data by the named pipe and, optionally, data being passed from the first reader process to the new reader process, and then terminates. The operating system activates the new reader process in response to the activate-on-receipt function call upon the receipt of data by the named pipe. Typically, the new reader process is a new instantiation of the first reader process that upon being activated performs the same steps as the first reader process.

19 Claims, 7 Drawing Sheets

OTHER PUBLICATIONS

SH31–0120–07 entitled Transmission Control Protocol/Internet Protocol, Version 4, Release 1, Eight Edition, dated Jan. 2000.

Paper entitled "Advanced Programming in the UNIX Environment" by W. Richard Stevens, Addison–Wesley Publishing Company, Inc., 1992, 2 cover pages plus pp. 396–402 and pp. 445–449.

Paper entitled "Operating System Concepts" by Abraham Silberschatz, University of Texas at Austin & James L. Peterson, Microelectronic & Computer Technology Corporation (MCC), Addison–Wesley Publishing Company, Reprinted with corrections Apr., 1989, 2 cover pages plus pp. 244–264 and pp. 297–302.

Paper entitled UNIX Network Programming vol. 2, Second Edition, Interprocess Communications, by W. Richard Stevens, Prentice Hall PTR, 1999, 2 cover pages plus pp. 54–66.

* cited by examiner

METHOD, APPARATUS AND PROGRAM STORAGE DEVICE FOR ENABLING THE READING OF DATA FROM A NAMED PIPE WHILE MINIMIZING THE USE OF SYSTEM RESOURCES

BACKGROUND OF THE INVENTION

1. Field of the Invention

This invention relates to a method, apparatus and program storage device for enabling the reading of data from a named pipe in an information handling system while minimizing the use of system resources.

2. Description of the Related Art

Figure 1:
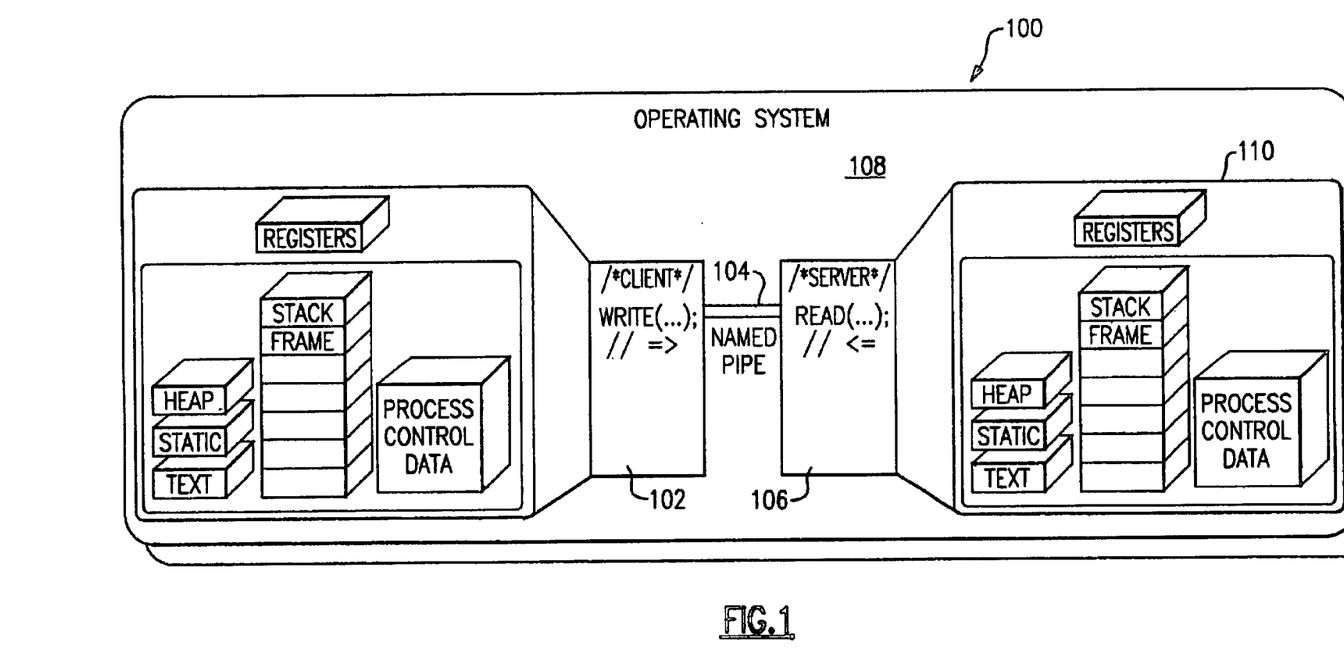
FIG. 1 shows an information handling system in which a client (writer) process interacts with a server (reader) process via a named pipe.

One mechanism for passing data from a first process to a second process in an information handling system is a FIFO list called a "named pipe". (i.e. created via mkfifo( ) function call). A named pipe is a data stream that programs read and write data to and from. Thus, FIG. 1 shows an information handling system 100 in which a client process 102 writes to a named pipe 104 by issuing a write( ) function call to the application program interface (API) of the operating system (OS) 108, while a server process 106 reads from the same pipe 104 by issuing a read( ) function call to the operating system 108. Named pipes, also referred to as FIFOs, are described in W. R. Stevens, *UNIX Network Programming*, volume 2 (2d ed. 1998) (Stevens I), at pages 54–66.

A named pipe application can run in either blocking or non-blocking mode. When running in blocking mode, if a read( ) function call is issued, all of the system resources 110 (FIG. 1) related to the reading process 106 are suspended in the system until another application (e.g., client 102) writes to the pipe 104 and unblocks the reading process (106), as described in W. R. Stevens, *Advanced Programming in the UNIX Environment* (1993) (Stevens II), at pages 445–449.

In the perfect world a computer operating system (OS) has unlimited amount of system resources such as random access memory (RAM) and CPU cycles. Unfortunately, as the amount of system resources increase through technological advancements so do the demands. One reason for the increased demand on system resources is the diverse number of applications that execute in the operating system—many of those applications are client/server applications sending/receiving data via named pipes.

The time between the read and write sequences can be long and far between. If the application 106 is running in non-blocking mode and a read( ) function call is issued, the application may or may not have data to read. If no data is available, a polling method is used for read( ). This means that a read( ) function call is issued every so often to determine if there is data to be read or a select( ) function is used to wake up the process when the data becomes available, as described in Stevens II at pages 396–402. This also ties up the resources the process uses while it is active in the system. In a high-performance transaction-oriented system, it is possible to have many processes active in the system currently suspended due to a named pipe read( ) function call. All the suspended processes can drain the system of the valuable resources needed to dispatch additional processes and preclude any new processes from being dispatched.

On certain operating systems the memory (virtual resource allocated to a process) required by the application is managed by the operating system. And even though the resources are virtual and managed by the operating system, they are still backed against real resources. When managing the resources the operating system has a certain overhead cost that must be taken into account. For example if it is memory and the amount of real memory is not available to back a new application virtual memory requirement, the OS "swaps" another process's virtual memory out of real memory and maps it the new requesting application virtual memory address, as described in A. Silberschatz and J. L. Peterson, *Operating System Concepts* (alternate ed. 1988), at pages 244–264. Thrashing may occur if enough requests arrive requiring greater memory than the available amount of real memory, as described in the same reference at pages 297–302. Furthermore, some operating systems do not offer the preemptive paging that allows for swapping another process's virtual memory. Hence, on those operating systems, the new memory requirement could not be fulfilled until another process voluntarily releases it.

What is desired, therefore, is a mechanism for enabling the reading of data from a named pipe without devoting scarce system resources to a reader process for which there is no data.

SUMMARY OF THE INVENTION

In general, the present invention contemplates a method, apparatus and program storage device for enabling the reading of data from a named pipe by a reader process (e.g., server process 106) while minimizing the use of system resources in an information handling system in which client and reader processes write data to and read data from a named pipe by issuing function calls to an operating system. In accordance with the invention, a first reader process creates a named pipe if it does not already exist and issues a read function call to the operating system specifying the named pipe to attempt to read data from the pipe. If the read operation is successful, the first reader process repeats the step of issuing the read function call. Otherwise, the first reader process issues an activate-on-receipt function call to the operating system, specifying the named pipe, a new reader process to be activated upon the receipt of data by the named pipe and, optionally, data to be passed from the first reader process to the new reader process, and then terminates. The operating system activates the new reader process in response to the activate-on-receipt function call upon the receipt of data by the named pipe. Typically, the new reader process is a new instantiation of the first reader process that upon being activated performs the same steps as the first reader process.

The present invention allows a reader process to exit, thereby releasing its associated system resources, and reactivates a new reader process when new data arrives. The new reader process reads data from the named pipe and may exit in a similar manner when there is no data to be read from the pipe, with another new reader process being activated when data arrives. The invention works with existing writer processes, which can write data to named pipes without modification.

A process wishing to write to an existing named pipe simply opens the pipe and writes the data. The reading process issues an activate-on-receipt system call that activates a new program when data arrives into the pipe, and exits. When the program exits, all the system resources associated with that process are released. It is only when the data arrives in the pipe that a new process will be executed.

DESCRIPTION OF THE PREFERRED EMBODIMENT

The present invention may be used in a system such as the system 200 shown in FIGS. 2A–2F, in which client processes 202 write to a named pipe 204 by issuing write( ) function calls to the operating system 208, while server processes 206 read from the same named pipe by issuing read( ) function calls to the operating system 208. System 200 may comprise any suitable computer system such as an IBM S/390 server. Operating system 208 may in turn comprise any suitable operating system such as the IBM Transaction Processing Facility (TPF). The system 200 differs from the system 100 shown in FIG. 1 through the use of the activate_on_receipt( ) function call by the server processes 206 as well as the response to that function call by the operating system 208.

The activate_on_receipt( ) function call of the present invention is an extension of an existing C language API of the same name supported by the IBM Transaction Processing Facility (TPF) operating system. The existing function call, which activates a specified program upon the receipt of data by a socket descriptor, is described in the IBM publication *Transaction Processing Facility Version 4 Release 1 Transmission Control Protocol/Internet Protocol* (*TPF V4R1 TCP/IP*), SH31-0120-07 (8th ed. 2000), at pages 12–8 to 12–11.

The format of the activate_on_receipt( ) function in the preferred embodiment is as follows:

int activate_on_receipt(unsigned int s, unsigned char *parm, unsigned char *pgm);

The parameters passed by the application program that issues this call are a file descriptor s, a program name pointer *pgm, and a token pointer *parm.

Figure 3:
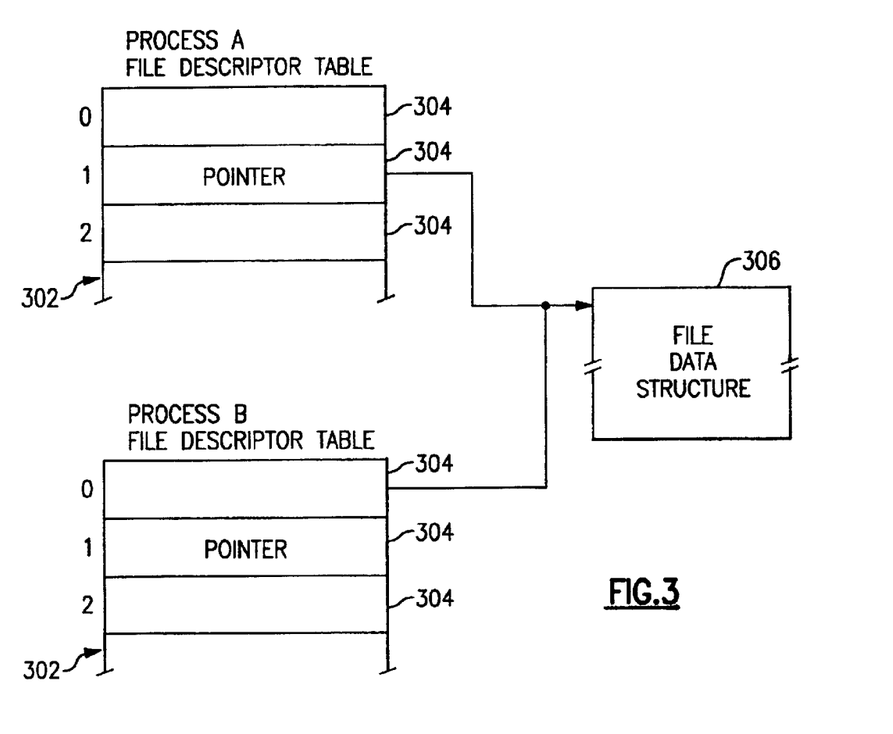
FIG. 3 shows the data structures associated with file descriptors.

By way of background, a file descriptor is a small integer used by a process to identify a file or similar object that has been opened by it for input/output (I/O). Certain file descriptors are generally reserved, such as ( ) for standard input, 1 for standard output, and 2 for standard error. Thus, the first file opened by a process may be assigned a descriptor of 3, the second file is assigned a descriptor of 4, and so on. The file descriptor is an index into a file descriptor table that is maintained for a particular process and which contains pointers to other data structures (e.g., vnodes) containing file access information. Thus, FIG. 3 shows a first file descriptor table 302 associated with a first process (A) and a second file descriptor table 302 associated with a second process B. Each file descriptor table 302 contains entries 304, indexed by the file descriptor proper (0, 1, 2, 3, . . . ). Each file descriptor table entry 304 in turn points to a data structure 306 associated with a particular file. When a process closes a file, the descriptor formerly assigned to that file becomes available for assignment to a subsequently opened file.

File descriptors are unique to a process, so that a file that has been opened by several processes may be assigned a different descriptor for each process. Thus, in FIG. 3 the table entry 304 associated with file descriptor 1 of process A points to the same file data structure 306 as the table entry 304 associated with file descriptor 0 of process B. (In the present application, the term "file descriptor" is also sometimes used not only to refer to the index (0, 1, 2, . . . ) itself, but also as a shorthand reference to the table entry 304 itself, to which the index points.) File descriptors are well known in the art and are described further in the Stevens I reference identified above.

Figure 7:
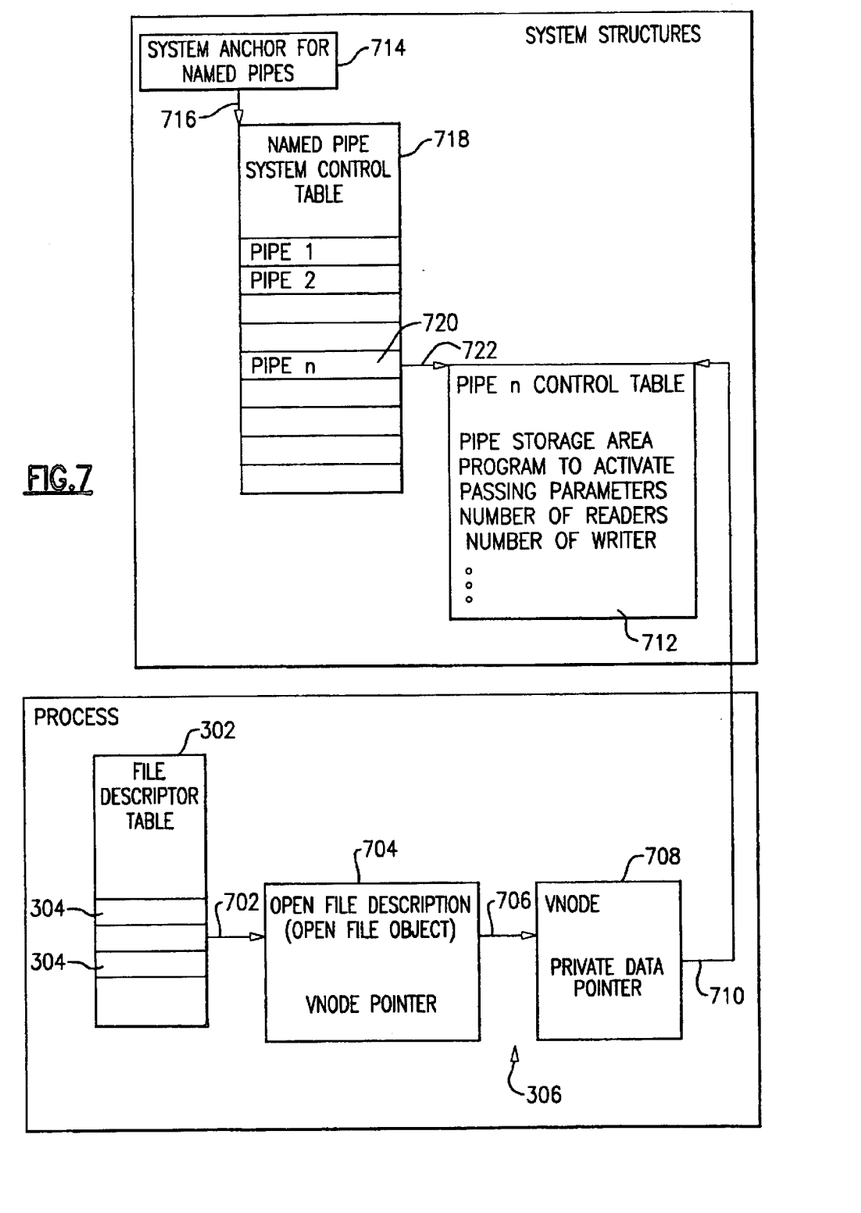
FIG. 7 shows the data structures associated with named pipes and how they interact with the data structures shown in FIG. 3.

FIG. 7 shows in somewhat more detail the file data structure 306 shown in FIG. 3. As shown in FIG. 7, an entry 304 for a named pipe 204 in a file descriptor table 302 for a particular process contains a pointer 702 to a structure 704 known as an open file description (OFD). OFD 704 in turn contains a pointer 706 to a vnode 708, which contains a pointer 710 to a control table 712 for the particular pipe 204. Also shown in FIG. 7 is a system anchor 714 for the named pipes 204 generally. System anchor 714 contains a pointer 716 to a named pipe system control table 718 containing an entry 720 for each named pipe 204. Each entry 718 in turn contains a pointer 722 to the same system control table 712 for the particular pipe 204.

In the activate_on_receipt( ) function call, the file descriptor s is an integer obtained by the calling application (e.g., a server process 206) from a prior open( ) function call made to open a FIFO special file (e.g., named pipe 204). The program name pointer *pgm contains the address of the program name string (pgm) that is entered when the data arrives for the host application program. The token pointer *parm contains the address of token data (parm) that the application is passing between processes. Although the invention is not limited to any particular length of token data, in the preferred embodiment this token data is 8 bytes in length.

FIGS. 2A–2F depicts the typical steps for using activate_on_receipt( ). In step 1, shown in FIG. 2A, a first server process 206 creates a FIFO special file 204 also known as a named pipe. This is done by issuing a mkfifo( ) function call to the operating system (OS) 208.

Figure 2A:
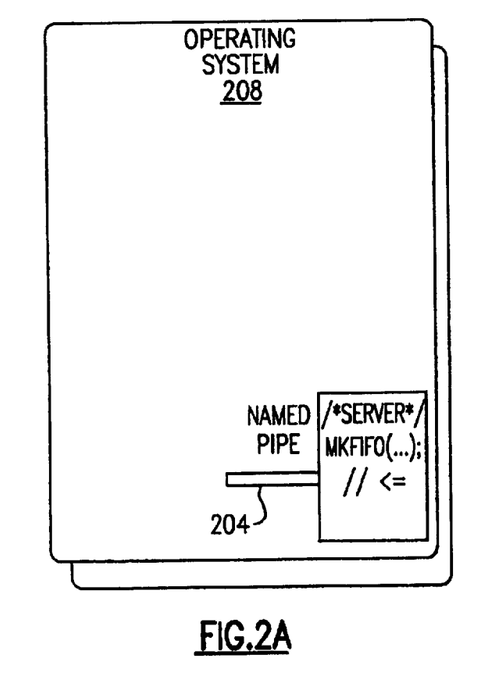
FIGS. 2A–2F show the typical steps involved in using the activate_on_receipt function call of the present invention.
Figure 2B:
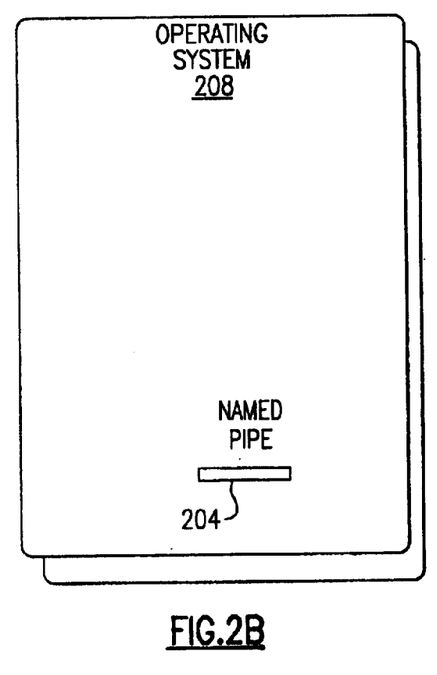

In step 2, shown in FIG. 2B, the first server process 206 issues an activate_on_receipt( ) function call to the OS 208 and exits.

Figure 2C:
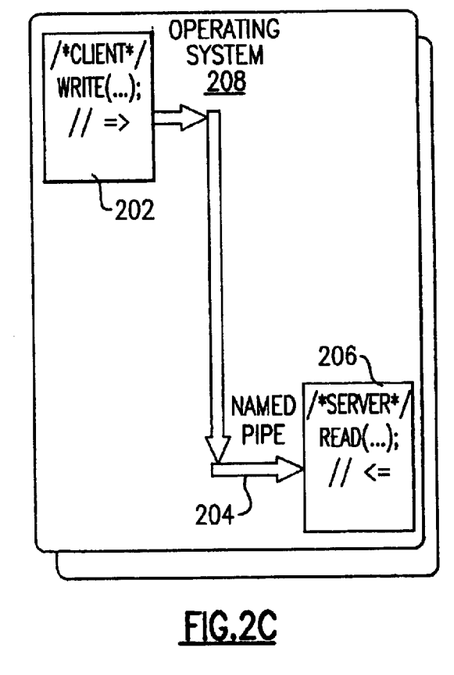

In step 3, shown in FIG. 2C, a client process 202 writes to the FIFO special file 204, then the operating system 208 creates a new server process 206.

Figure 2D:
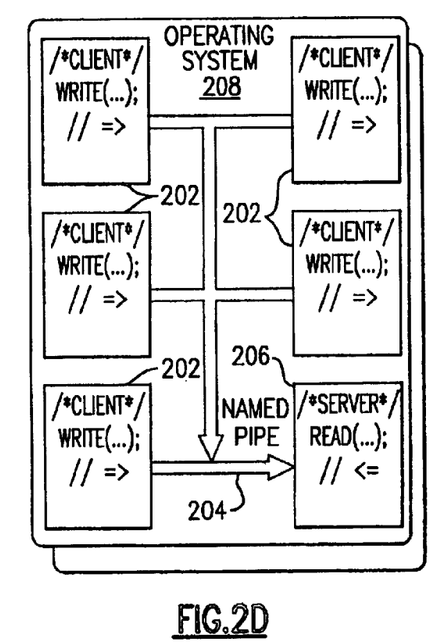

In step 4, shown in FIG. 2D, additional client processes 202 write to the same FIFO special file 204, while the new server process 206 continues to read.

Figure 2E:
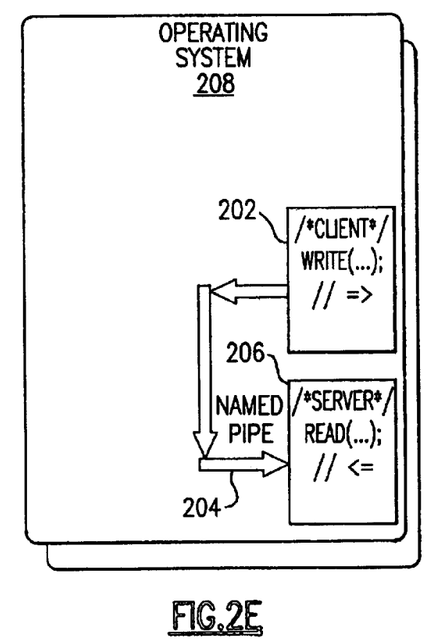

In step 5, shown in FIG. 2E, most of the client processes 202 exit.

Figure 2F:
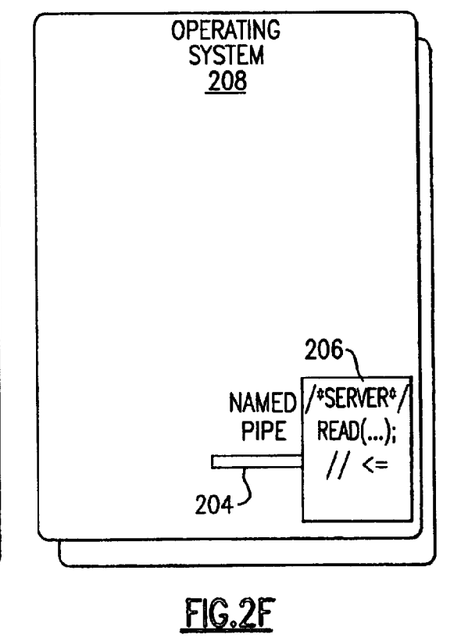

In step 6, shown in FIG. 2F, after the last client 202 exits and no more data is available to be read, the cycle begins again at step 2.

Figure 4:
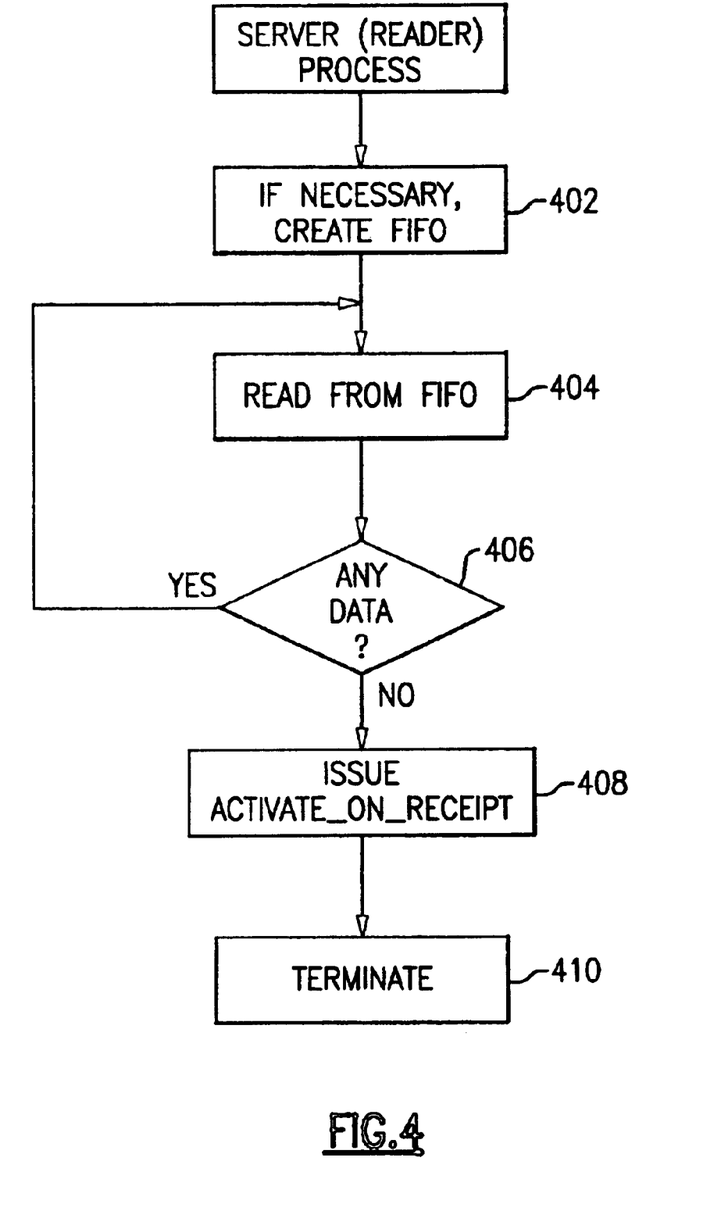
FIG. 4 shows the overall flow of the present invention from the standpoint of a server (reader) process.

FIG. 4 shows the overall flow of the present invention from the standpoint of a server (reader) process 202. Upon being created, the server process 202 issues a mkfifo( ) function call to the OS 208 to create a FIFO or named pipe 204 if it does not already exist (as it would for the new server process 202) (step 402). The server process 202 then attempts to read from the named pipe 204 by issuing a read( ) function call to the OS 208 (step 404). If the read operation was successful—i.e., if the named pipe 204 contained data to be read (step 406)—the server process 202 returns to step 404 to issue another read( ) function call. If, on the other hand, the named pipe 204 was empty (either because it was just created or because it contents have been previously read), the server process 202 issues an activate_on_receipt( ) function call to the OS 208 (step 408). The server process 202 thereafter terminates (step 410).

Figure 5:
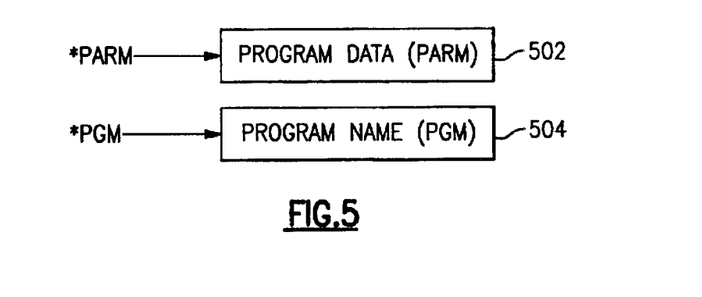
FIG. 5 shows the program name and data pointed to by the parameters of the activate_on_receipt function call.

Referring also to FIG. 5, the activate_on_receipt function call specifies as parameters a file descriptor s identifying the named pipe 204, a program data pointer (*parm) pointing to a storage location 502 containing data (parm) to be passed to the program to be activated, and a program name pointer (*pgm) to a storage location 504 containing the name (pgm) of the program to be activated upon the receipt of data in the named pipe 204 (step 408).

Figure 6:
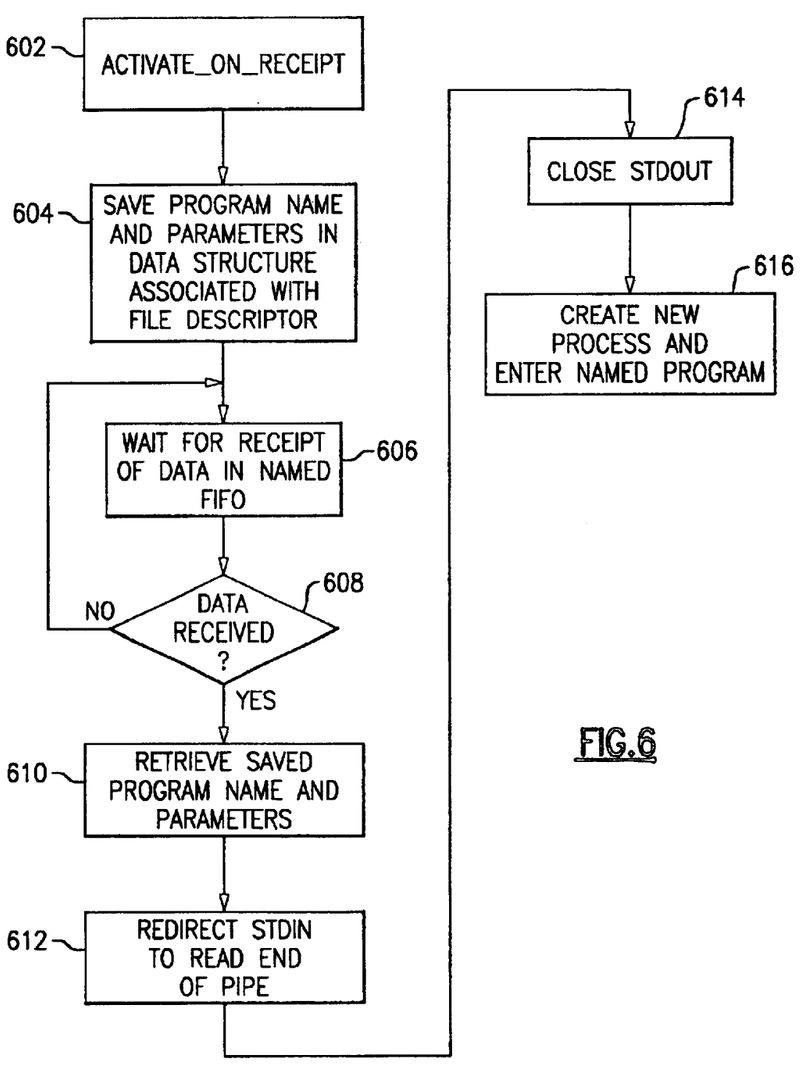
FIG. 6 shows the overall flow of the present invention from the standpoint of the operating system.

FIG. 6 shows the overall process from the standpoint of the operating system 208. Upon receiving an activate_on_receipt function call (step 602), the operating system 208 saves the program name (pgm) and the passing parameters (parm) in the system control table 712 (FIG. 7) associated with the file descriptor s (step 304). The OS 208 then waits for the receipt of data by the named pipe 204 specified by the file descriptor s (step 606). Upon detecting the receipt of such data by the named pipe 204 (step 608), the operating system 208 retrieves the stored program name pgm and parameters parm from the system control table 712 associated with the file descriptor (step 610). After redirecting standard input (STDIN) to point to the read end of the pipe 204 (step 612) and closing standard output (STDOUT) (step 614), the operating system 208 activates the program specified by the program name pgm, creating a new server process 206 and passing to it the program data parm (step 616). By redirecting the standard input (STDIN), the OS 208 allows the new server process 206 to obtain the data from the named pipe 204 simply by issuing a standard read( ) function call using STDIN (file descriptor 0).

While a particular embodiment has been shown and described, it will be apparent to those skilled in the art that various modifications may be made without departing from the spirit of the invention.

What is claimed is:

1. In an information handling system in which processes write data to and read data from a named pipe by issuing function calls to an operating system, a method of enabling the reading of data from a named pipe by a reader process while minimizing the use of system resources, said method comprising the steps of:
    having a first reader process issue a read function call to the operating system specifying said named pipe as the pipe to read data from; and
    if there was no data to be read from said pipe, having said first reader process issue an activate-on-receipt function call to said operating system specifying a new reader process to be activated upon the receipt of data by said named pipe and then terminate.

2. The method of claim 1 in which said new reader process is a new instantiation of said first reader process.

3. The method of claim 1 in which said activate-on-receipt function call specifies said named pipe.

4. The method of claim 1 in which said activate-on-receipt function call specifies data being passed from said first reader process to said new reader process.

5. The method of claim 1, comprising the initial step of:
    having said first reader process create said named pipe if it does not already exist.

6. The method of claim 1, comprising the further step of:
    having said first reader process repeat said step of issuing said read function call if there was data to be read from said pipe.

7. The method of claim 1, comprising the further step of:
    having said operating system activate said new reader process in response to said activate-on-receipt function call upon the receipt of data by said named pipe.

8. In an information handling system in which processes write data to and read data from a named pipe by issuing function calls to an operating system, apparatus for enabling the reading of data from a named pipe by a reader process while minimizing the use of system resources, said apparatus comprising:
    means associated with a first reader process for issuing a read function call to the operating system specifying said named pipe as the pipe to read data from; and
    means associated with said first reader process and operative if there was no data to be read from said pipe for issuing an activate-on-receipt function call to said operating system specifying a new reader process to be activated upon the receipt of data by said named pipe and then terminating.

9. The apparatus of claim 8, further comprising:
    means associated with said first reader process for initially creating said named pipe if it does not already exist.

10. The apparatus of claim 8, further comprising:
    means associated with said first reader process for repeating said read function call if there was data to be read from said pipe.

11. A program storage device readable by a machine, tangibly embodying a program of instructions executable by the machine to perform method steps for enabling the reading of data from a named pipe by a reader process while minimizing the use of system resources in an information handling system in which processes write data to and read data from a named pipe by issuing function calls to an operating system, said method steps being performed by said preexisting reader process and comprising:
    having a first reader process issue a read function call to the operating system specifying said named pipe as the pipe to read data from; and
    if there was no data to be read from said pipe, having said first reader process issue an activate-on-receipt function call to said operating system specifying a new reader process to be activated upon the receipt of data by said named pipe and then terminate.

12. The program storage device of claim 11, comprising the initial step of:
    having said first reader process create said named pipe if it does not already exist.

13. The program storage device of claim 11, comprising the further step of:
    having said first reader process repeat said step of issuing said read function call if there was data to be read from said pipe.

14. The program storage device of claim 11, comprising the further step of:
    having said operating system activate said new reader process in response to said activate-on-receipt function call upon the receipt of data by said named pipe.

15. In an information handling system in which processes write data to and read data from a named pipe by issuing function calls to an operating system, a method of enabling the reading of data from a named pipe by a reader process while minimizing the use of system resources, said method comprising the steps of:
    having a first reader process issue a read function call to the operating system specifying said named pipe as the pipe to read data from; if there was no data to be read from said named pipe, having said first reader process issue an activate-on-receipt function call to said operating system specifying a new reader process to be activated upon the receipt of data by said named pipe and then terminate;

having said operating system receive said activate-on-receipt function call from said first reader process; and having said operating system activate said new reader process in response to said activate-on-receipt function call upon the receipt of data by said named pipe.

16. The method of claim 15 in which said activate-on-receipt function call specifies said named pipe.

17. The method of claim 15 in which said activate-on-receipt function call specifies data being passed from said preexisting reader process to said new reader process.

18. In an information handling system in which processes write data to and read data from a named pipe by issuing function calls to an operating system, apparatus for enabling the reading of data from a named pipe while minimizing the use of system resources, said apparatus comprising:

means associated with a first reader process for issuing a read function call to the operating system specifying said named pipe as the pipe to read data from; means associated with said first reader process and operative if there was no data to be read from said named pipe for issuing an activate-on-receipt function call to said operating system specifying a new reader process to be activated upon the receipt of data by said named pipe and then terminating;

means associated with said operating system for receiving said activate-on-receipt function call from said first reader process; and mean associated with said operating system and responsive to said activate-on-receipt function call for activating said new reader process upon the receipt of data by said named pipe.

19. A program storage device readable by a machine, tangibly embodying a program of instructions executable by the machine to perform method steps for enabling the reading of data from a named pipe while minimizing the use of system resources in an information handling system in which processes write data to and read data from a named pipe by issuing function calls to an operating system, said method steps comprising:

having a first reader process issue a read function call to the operating system specifying said named pipe as the pipe to read data from; if there was no data to be read from said named pipe, having said first reader process issue an activate-on-receipt function call to said operating system specifying a new reader process to be activated upon the receipt of data by said named pipe and then terminate;

having said operating system receive said activate-on-receipt function call from said first reader process; and having said operating system activate said new reader process in response to said activate-on-receipt function call upon the receipt of data by said named pipe.

* * * * *